No. 866,445. PATENTED SEPT. 17, 1907.
W. T. ELLIFF.
HAY RACK.
APPLICATION FILED JUNE 13, 1906.
2 SHEETS—SHEET 1.
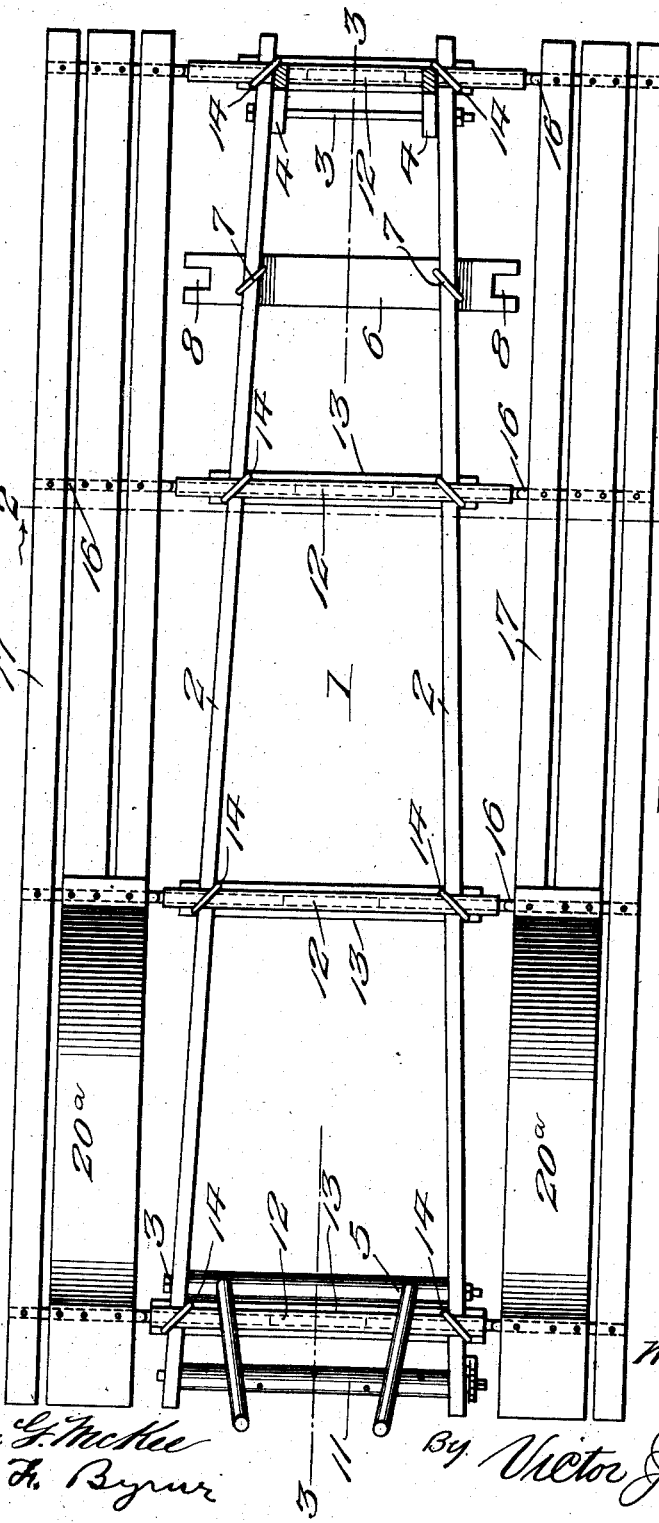
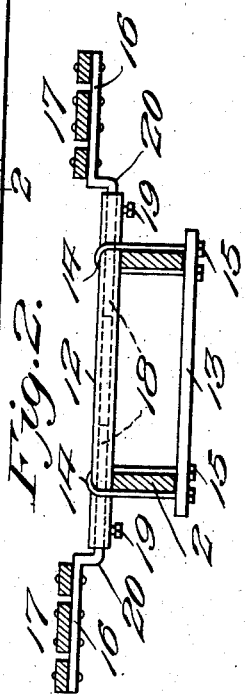

No. 866,445. PATENTED SEPT. 17, 1907.
W. T. ELLIFF.
HAY RACK.
APPLICATION FILED JUNE 13, 1906.
2 SHEETS—SHEET 2.
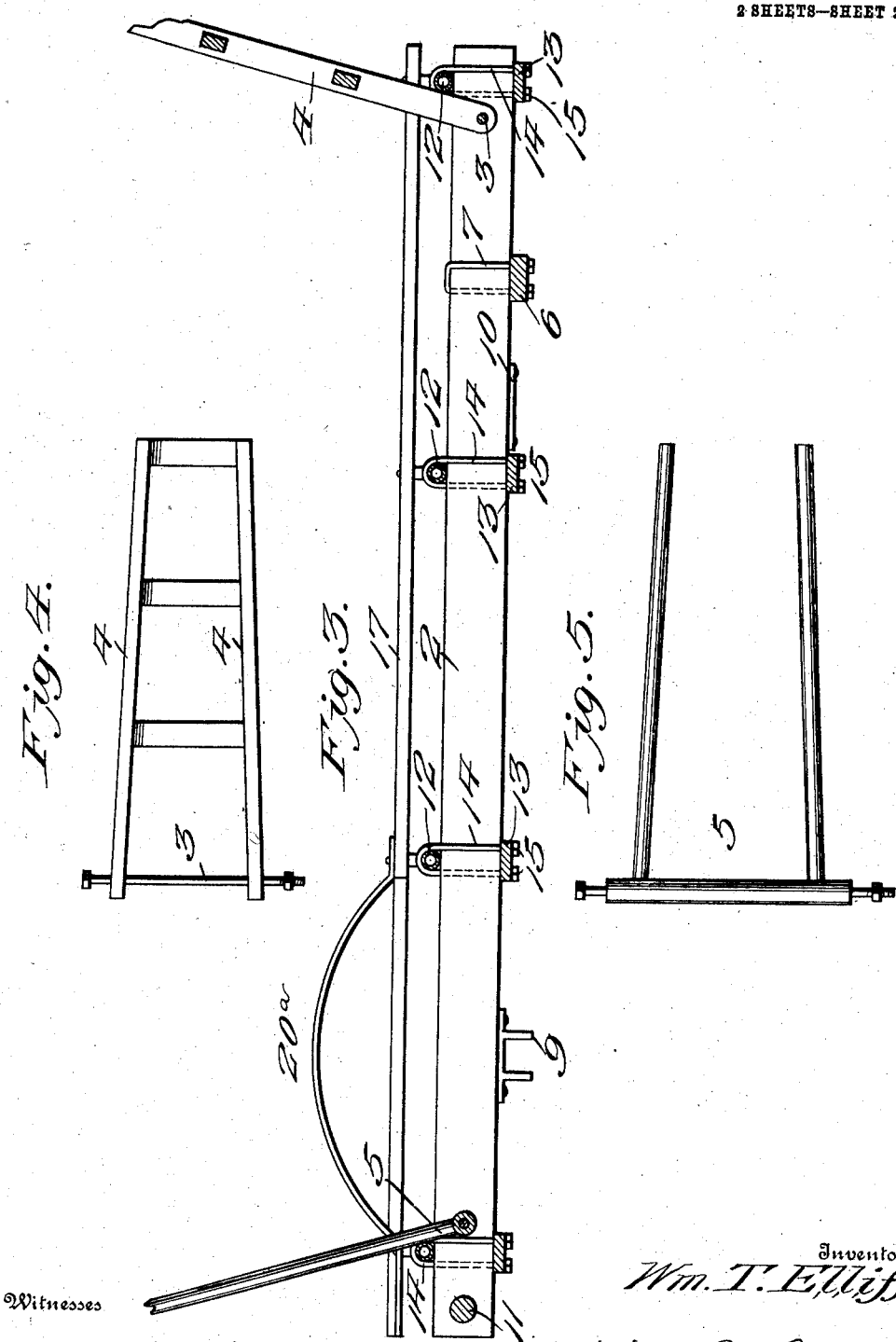

UNITED STATES PATENT OFFICE.

WILLIAM T. ELLIFF, OF MACKINAW, ILLINOIS.

HAY-RACK.

No. 866,445.  Specification of Letters Patent.  Patented Sept. 17, 1907.

Application filed June 13, 1906. Serial No. 321,483.

*To all whom it may concern:*

Be it known that I, WILLIAM T. ELLIFF, a citizen of the United States, residing at Mackinaw, in the county of Tazewell and State of Illinois, have invented new and useful Improvements in Hay-Racks, of which the following is a specification.

My invention relates to hay racks, and its primary object is to provide a novel and highly useful device of this character which is adapted to be used in connection with any construction of running gear, and one wherein its sides may be adjusted to increase or decrease its width, and readily and quickly applied to or removed from the body of the rack.

With the above and other objects in view, the invention consists of the construction, combination and arrangement of parts hereinafter fully described, claimed and illustrated in the accompanying drawings, wherein:

Figure 1 is a top plan view of a hay rack constructed in accordance with my invention. Fig. 2 is a transverse section on the line 2—2 of Fig. 1, looking in the direction indicated by the arrow. Fig. 3 is a central and longitudinal section thereof on the line 3—3 of Fig. 1. Fig. 4 is a view in elevation of the front standard, and Fig. 5 is a similar view of the rear standard.

Referring to the drawings by reference numerals, 2 designates side beams which comprise the body of the rack and which are secured together by rods 3. Front and rear standards 4—5 are pivotally mounted upon the rods 3 between the side beams 2, said standards spacing the beams apart. A member 6 is secured to the under edges of the side beams 2 at a point adjacent their front ends by U-shaped bolts 7. The ends of the member are provided with recesses 8 for the reception of the front standards of a running gear. Brackets 9 are secured to the under edges of the side beams 2 at a point adjacent their rear ends for engagement with the rear bolster of a running gear. Chafe irons 10 are secured to the under edges of the side beams 2 in rear of the member 6. A roller 11 is journaled between the side beams 2 at a point near their rear ends and provides means by which the load may be secured against displacement upon the hay rack by a rope, one end of which is adapted to be secured to the front of the rack and the other end to said roller.

Hollow cross bars 12 are secured to the upper edges of the side beams 2 and cross pieces 13 are secured to the under edges thereof by U-shaped bolts 14. The bolts 14 engage over the cross bars 12 and embrace the side beams and have their ends let through the cross pieces 13, nuts 15 being tapped upon the ends of the bolts. Arms 16 which carry the slats 17 forming the sides of the hay rack, are provided with shanks 18 which fit within the ends of the cross bars 12 to adjustably mount the sides of the hay rack upon the body thereof. The sides of the hay rack are secured in their adjusted positions by bolts 19, which are let through the cross bars 12 and which engage in openings in the shanks 18. The arms 16 are offset, as at 20, to support the sides of the hay rack above the cross bars 12. The inner and center slats of the sides terminate at a point short of the length of the sides to permit of the reception of the rear wheels of a running gear. Bowed members 20$^a$ are secured to the rear of the arms 16 to house the rear wheels.

It should be apparent from the above description taken in connection with the accompanying drawings, that I provide a hay rack which is simple and durable of construction, which may be applied to any construction of running gear, one wherein the sides may be adjusted to increase or decrease its width, and one which may be manufactured and sold at a comparatively low cost.

From the foregoing description taken in connection with the accompanying drawings, the construction and mode of operation of the invention should be understood without a further extended description.

Changes in the form, proportions and minor details of construction may be made within the scope of the invention without departing from the spirit or sacrificing any of the advantages thereof.

Having fully described and illustrated my invention, what I claim is:

1. A hay rack comprising a body portion, a hollow bar secured to the body portion, a side, an arm secured to the side and adjustably engaging the bar, and means for securing the arm in adjusted position.

2. A hay rack comprising a body portion, hollow cross bars, cross pieces, U-shaped bolts securing the bars and cross pieces to the body, arms provided with shank portions adjustably engaging the bars, means for securing the arms in adjusted position, and slats secured to said arms.

In testimony whereof, I affix my signature in presence of two witnesses.

WILLIAM T. ELLIFF.

Witnesses:
CHAS. D. WARNER,
LAURA HUFF.